(12) United States Patent
Tattershall

(10) Patent No.: US 7,077,486 B2
(45) Date of Patent: Jul. 18, 2006

(54) ENCLOSURE FOR HANDLING HAZARDOUS MATERIAL

(76) Inventor: Stephen F. Tattershall, 7280 Quail Run, West Chester, OH (US) 45069

( * ) Notice: Subject to any disclaimer, the term of this patent is extended or adjusted under 35 U.S.C. 154(b) by 479 days.

(21) Appl. No.: 10/326,757

(22) Filed: Dec. 20, 2002

(65) Prior Publication Data

US 2006/0119232 A1    Jun. 8, 2006

(51) Int. Cl.
*A61G 11/00* (2006.01)
(52) U.S. Cl. ............ 312/1; 312/352; 417/313; 417/572; 417/423.9; 73/299; 73/700; 73/756
(58) Field of Classification Search ............ 417/313 X, 417/572, 423.9; 73/249, 700–756; 312/1 X, 312/352
See application file for complete search history.

(56) References Cited

U.S. PATENT DOCUMENTS

| 314,569 | A | * | 3/1885 | Gilmont | 12/142 R |
| 1,240,123 | A | * | 9/1917 | Cotton | 73/747 |
| 1,642,577 | A | * | 9/1927 | Carson | 312/1 |
| 1,928,096 | A | * | 9/1933 | Dubrovin | 73/713 |
| 3,267,830 | A | * | 8/1966 | Gaasbeek | 454/370 |
| 3,410,619 | A | | 11/1968 | Delnay et al. | |
| 4,108,509 | A | | 8/1978 | Piet et al. | |
| 5,299,243 | A | * | 3/1994 | Picco | 376/287 |
| 5,342,121 | A | * | 8/1994 | Koria | 312/1 |
| 5,685,771 | A | * | 11/1997 | Kleppen | 454/56 |
| 5,704,381 | A | * | 1/1998 | Millan et al. | 134/102.2 |
| 6,367,518 | B1 | * | 4/2002 | Duncan | 141/97 |
| 6,428,122 | B1 | * | 8/2002 | Henry et al. | 312/1 |
| 6,595,247 | B1 | * | 7/2003 | Landy et al. | 141/97 |

FOREIGN PATENT DOCUMENTS

GB        2233441 A  *  9/1991

* cited by examiner

*Primary Examiner*—Charles G. Freay
*Assistant Examiner*—Emmanuel Sayoc
(74) *Attorney, Agent, or Firm*—R. William Graham

(57) ABSTRACT

An enclosure for handling hazardous material includes a sealable housing which is configured with a first air inlet connected to a bubble gauge and a second air inlet disposed inside the housing for air evacuation from the housing is connected to a pump for maintaining subatmospheric pressure in the enclosure and for drawing a stream of air inwardly through the first air inlet via the bubble gauge into the housing and out the second air inlet. A filter interposed in the stream of air leading to the second inlet. At least one glove port is formed in the housing and has a flexible relatively gas impermeable glove connected thereto. An air exchange port in the housing is operably connected to a sealed bellows which provides for changes in air volume within the enclosure which occurs from moving the glove within the enclosure under subatmospheric pressure.

20 Claims, 3 Drawing Sheets

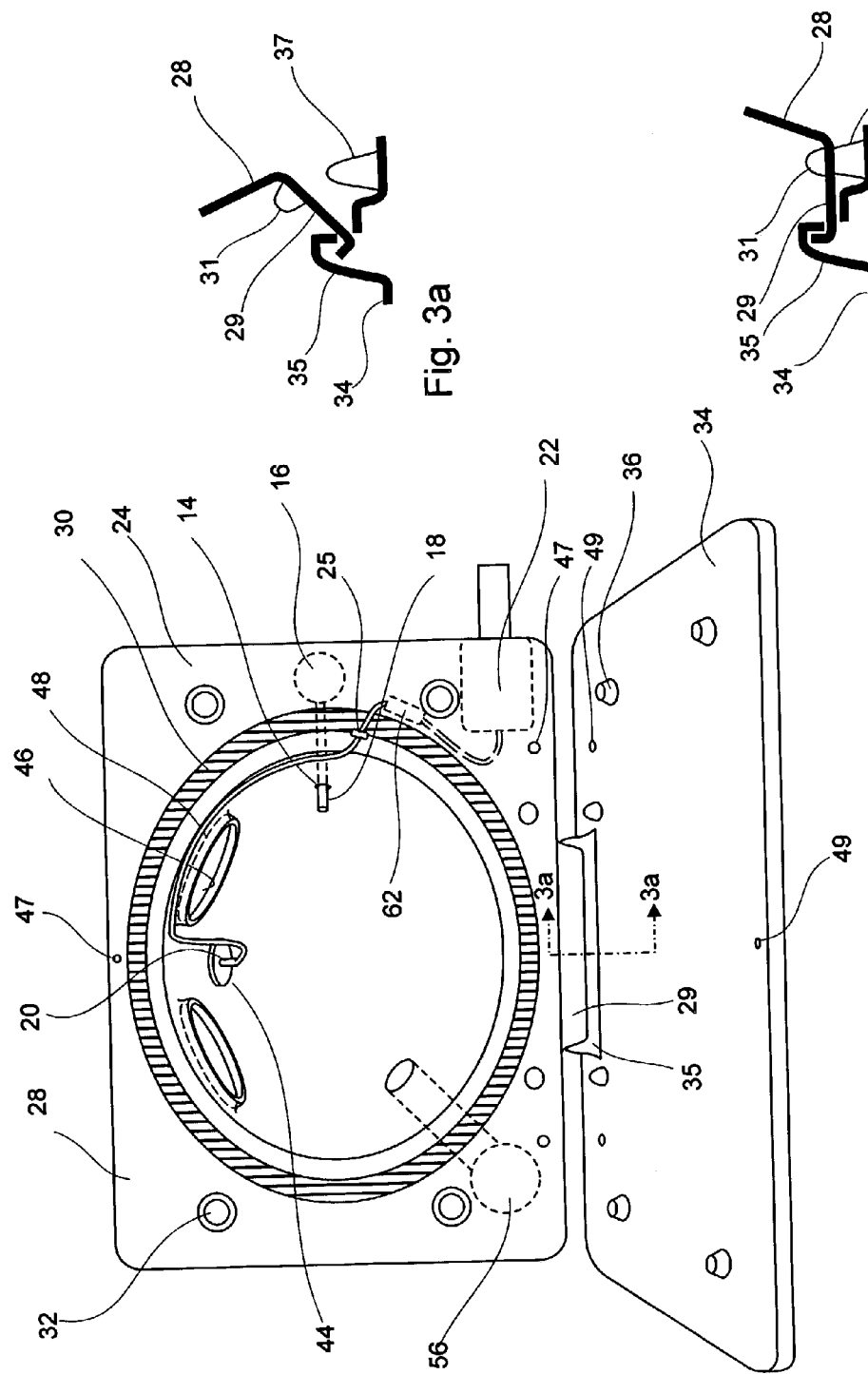

ENCLOSURE FOR HANDLING HAZARDOUS MATERIAL

BACKGROUND OF THE INVENTION

1. Field of the Invention

The present invention relates to enclosures for handling hazardous material. More specifically, the invention is directed to an evacuated enclosure which is used for handling, inspecting or processing hazardous materials, irritating substances or articles or containers known or suspected of containing the same.

2. Discussion of the Art

There previously exist a number of enclosures for handling chemical, nuclear or bio-hazardous material in a self contained environment. These enclosures are commonly employed in industrial laboratory environments.

Recently, national concerns over health hazards resulting from bio-hazardous mail, chemical weapons, or nuclear materials, require the use of a contained environment for handling suspect mail and other objects. Prior hereto, the devices for handling bio-hazardous materials used relatively non-portable vented hoods and sophisticated filtering mechanisms. Current mail cleaning centers propose use of enclosed environments with a filtered exhaust unit and in some cases means of destroying the suspected bio-hazardous material. These centers focus on handling mail through postal carriers.

Inexpensive mail opening devices for consumer and office use which exist provide containment, but are inadequate in their ability to provide a suitable evacuated environment. For example, glove bags exist for portable clean-up or inspection, but provide no vacuum.

However, there remains a need for a relatively inexpensive device for relatively fail safe handling of hazardous and potentially hazardous material in a portable relatively inexpensive manner. This requires secure protection from aerosols and gases provided by vacuum in the enclosure. The enclosure of the present invention overcomes the deficiency in the art. As will be better understood from the discussion which follows, the enclosure for handling hazardous materials of the present invention provides a controlled environment wherein handling of the material can occur and can be readily and safely contained and removed from a site. The enclosure of the present invention also provides a readily portable and economical enclosure.

SUMMARY OF THE INVENTION

It is an object of the present invention to provide an enclosure for handling hazardous materials in which hazardous material and suspect material can be safely handled without fear of contamination of the technician, the surrounding atmosphere, or the operational area in which the work enclosure is used.

It is another object of the present invention to provide an enclosure for handling hazardous material which is relatively economical.

It is another object of the invention to provide an enclosure for handling hazardous material which is disposable.

It is another object of the invention to provide an enclosure for handling hazardous material which is self scaling through the use of a vacuum.

It is still another object of the invention to provide an enclosure for handling hazardous material which meets federal regulatory standards for dealing with hazardous material in a relatively inexpensive manner.

It is a further object of the invention to provide an enclosure for handling hazardous material which is user friendly having a simple visual confirmation that a relatively sealed environment exists.

It is yet another object to provide an enclosure for handling hazardous materials which provides for air flow through a filter system contained therein.

It is another object to provide an enclosure for handling hazardous material which is relatively lightweight and manually portable, attractive, reliable in use, requires minimum maintenance, provides maximum safety to the user, and yet is of a simple design which can be readily and inexpensively manufactured.

These and other objects of the invention are achieved by an enclosure for handling hazardous material of the present invention. The enclosure includes a sealable housing which is configured with a first air inlet connected to a bubble gauge, a second air inlet disposed inside the housing for air evacuation from the housing is connected to a pump for maintaining subatmospheric pressure in the enclosure and for drawing a stream of air inwardly through the first air inlet via the bubble gauge into the housing and out the second air inlet. The system further includes at least one filter interposed in the stream of air leading to the second inlet for preventing particulate materials from escaping from the housing through the second air inlet. Multiple air treatments can be employed in the invention, including filters, chemical baths, radiation, thermal or other treatment to effectively move the air through the treatment and enable the hazardous material to a be sent to safe discharge point. At least one glove port is formed in the housing and has a flexible relatively gas impermeable glove connected thereto, wherein the glove extends in the enclosure to enable objects to be handled therein. The housing includes another air exchange port which is operably connected to a sealed bellows which provides for changes in air volume within the enclosure which occurs from moving the glove within the enclosure under subatmospheric pressure.

The enclosure can preferably be a transparent convex dome having a bottom lip which is configured with a seal to enable a sealable connection to a flat surface. A base can be provided which mates to the lip and is hingedly connected thereto such that the housing is sealably and securely connectable to the base.

The invention is valuable for many applications where glove boxes, bio-safety cabinets, or fume hoods, for example, are impractical. Applications of the invention include clinical labs, military field testing, hazardous material clean-up of chemical or nuclear or bio material, forensic investigation, production and research and development handling of hazardous material and for direct attachment to surface containers having such hazardous material therein.

Other objects and advantages will be readily apparent to those skilled in the art upon viewing the drawings and reading the detailed description hereafter

BRIEF DESCRIPTION OF THE DRAWINGS

FIG. 3 is a side view of a part of the invention in an open position.

FIG. 3a is a partial cross section through FIG. 3 at line 3a—3a in an open position.

FIG. 3b shows a part cross section of FIG. 3a in a closed position.

PREFERRED EMBODIMENT OF THE INVENTION

Figure 1:
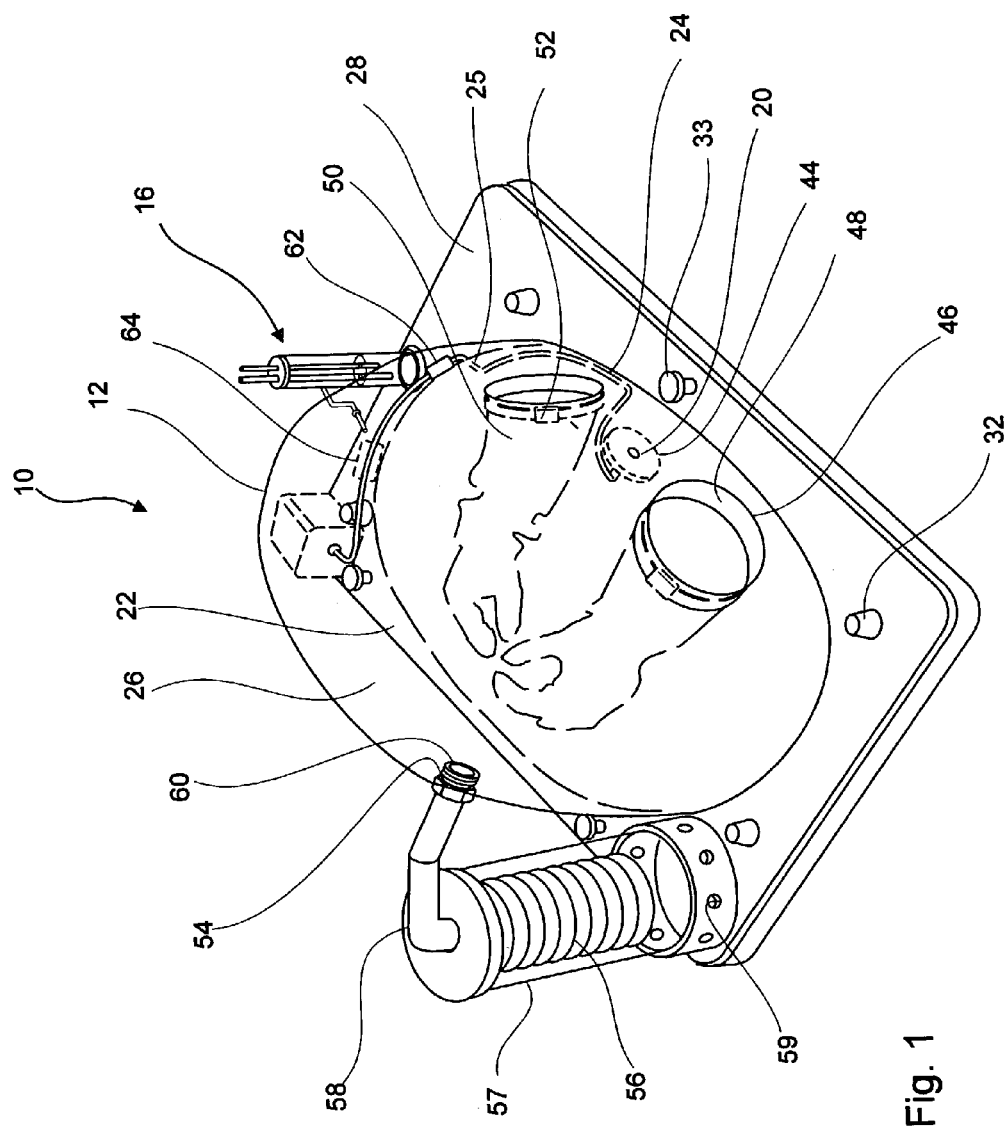
FIG. 1 is a perspective view of the present invention.
Figure 2:
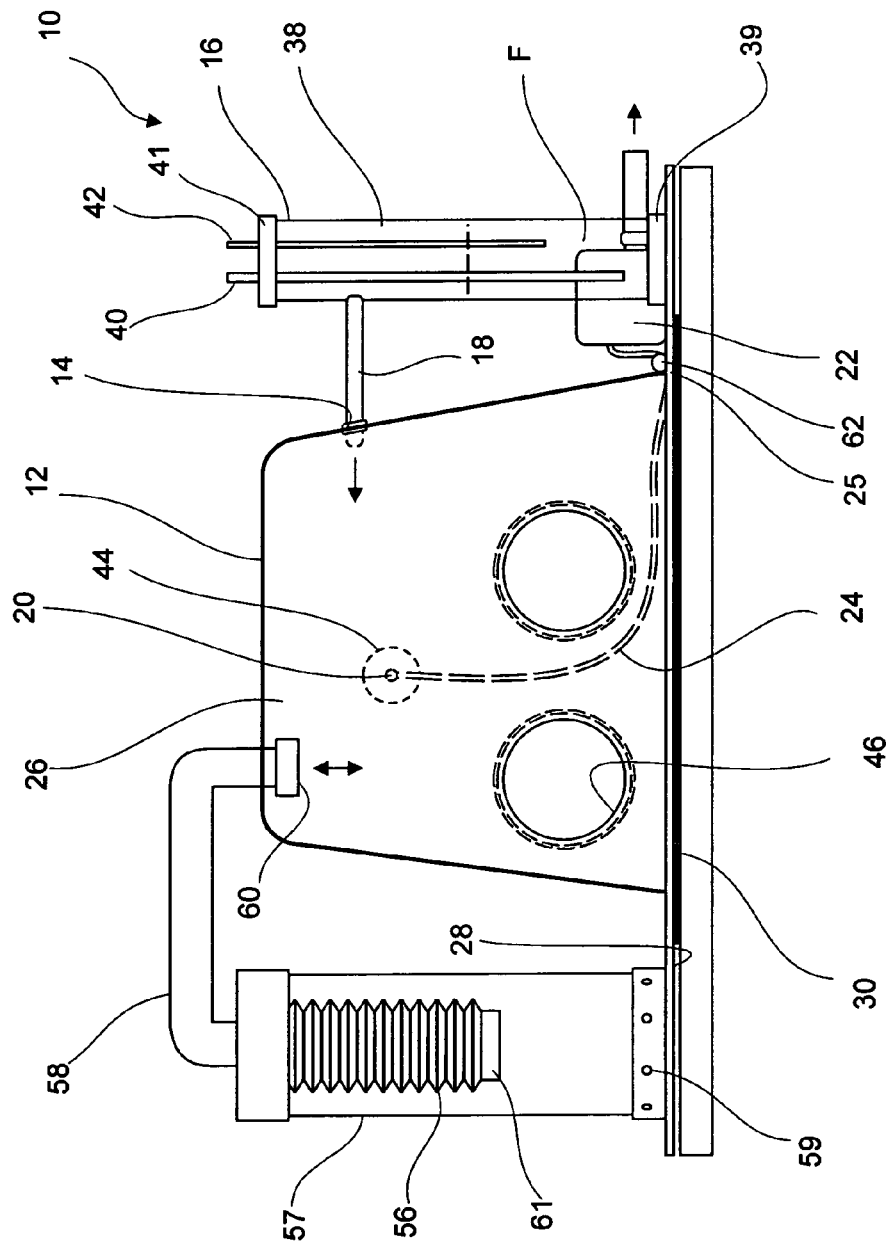
FIG. 2 is a side view of the invention.

Referring now to the drawings, the present invention is directed to an enclosure for handling hazardous and suspect material which is generally designated by the numeral 10. The enclosure 10 includes a sealable housing 12 which is configured with an air inlet 14 which is connected to a bubble gauge 16 via a conduit 18.

An air inlet 20 is disposed inside the housing 12 and is for air evacuation from the housing 12 and operably connects to a pump 22 via a conduit 24 for maintaining subatmospheric pressure in the enclosure 10 and for drawing a stream of air inwardly through the air inlet 14 via the bubble gauge 16 into the housing 12 and out the air inlet 20. The conduit 24 is press fit through an open surface 25 in the housing 12. The pump 22 can be an electric diaphragm pump—24 VAC×UL transformer having a power consumption of 3 Watts and provide sufficient suction to maintain flow rate between 0.5 to 1.5 liters/min.

The housing 12 can preferably include a transparent convex dome 26 which has a bottom flange lip 28 which is relatively flat and configured with a seal 30 to enable a sealable connection to a flat surface. The housing 12 can be made from plastic in a thermoformed manner. A plurality of recessed surfaces 32 can also be formed in the lip 28.

A relatively flat base 34 is provided which mates to the lip 28 along the seal 30 and is hingedly connected thereto such that the housing 12 is sealably connectable to the base 34. The base 34 is formed with protruding surfaces 36 which are spatially positioned on the base 34 and are configured to be received within the recessed surfaces 32. The surfaces 34 and 36 serve the purpose of aiding in alignment when the housing 12 is brought in contact with the base 34 as well as maintaining a seal therebetween by preventing lateral movement between the two. The lip 28 is provided with a hinge portion 29 to mate with a protruding hinge portion 35 from base 34. Female portions 31 on lip 28 mate with male portions 37 of base 34 to further aid in connection between the two.

A plurality of locking thumb screws 33 operably interconnect the base 34 and lip 28 through coaxially aligned holes 47 and 49 formed in the lip 28 and base 34, respectively. The hinged functionality and lockable mooring points provided by the screws 33 provide secure shipping, safety in use and sealed containment.

The bubble gauge 16 includes a column 38 which is preferably sealed at both top end 41 and bottom end 39, wherein the end 39 can be connected to a top portion of the lip 28. The column 38 is closed to atmospheric pressure. A part of the column 38 is filled with a fluid F which can be water, oil or alcohol, for example and can be colored with a dye to aid in visual confirmation indicating air passing therein. The level of the fluid F is preferably operably below the connection point of the conduit 18 to the column 38. A large bore dip tube 40 (e.g., 0.25" ID) sealably extends through the end 41 and into the fluid F in a range of ½" to 1 and ½" below top fluid F surface. Optionally, a small bore dip tube 42 (e.g., 0.0625" ID) may likewise be provided, wherein the tubes 40 and 42 can be set at different depths in the fluid F to provide different visual indicators of pressure in the sealed enclosure 10. Under normal operating conditions, containment pressure should be −0.2 to −3.5 inches of water. While the column 38 is shown outside the housing 12 and ends of the tubes 40 and 42 open to atmospheric pressure 12, it is contemplated that column could be inside the housing 12, with the dip tubes 40 and 42 extending outside the housing to the atmospheric pressure.

The system further includes a filter 44, which can be a HEPA filter, and is interposed in a stream of air between leading to the inlet for air evacuation from the housing 20 for preventing particulate materials from escaping from the enclosure 10 through the air inlet 20. Two glove ports 46 are formed in housing 12 and include an inwardly extending cylindrical lip 48 which is preferably part of a thermoforming process of the housing 12.

A pair of flexible relatively gas impermeable gloves 50 are provided, wherein each is connected to one of the lips 48 via a band clamp 52, wherein the gloves 50 extend in the enclosure 10 to enable suspect or hazardous objects to be handled therein. The gloves 50 can be made from a rubber nitrile material.

The air exchange port 54 in the housing 12 is operably connected to a sealed bellows 56 via a tube 58 which provides for changes in air volume within the enclosure 10 which occurs from moving the gloves 50 within the enclosure 10 when under pressure. Another filter 60 can be provided to prevent the bellows 56 from contamination and easing the decontamination process within the housing 12. The sealed bellows 56 can be mounted in a chamber 57 which can be connected to a top portion of the lip 28, as can the pump 22 for ease of use and portability. The bottom 61 of the chamber 57 includes openings 59 to provide the chamber 57 open to atmospheric pressure. The bottom 61 of the bellows 56 is weighted such that when the pump 22 creates a predetermined negative pressure in the enclosure the bellows operates to partially collapse and provide a visual indication of a safe, negatively pressurized environment. The seals between the inlet 14, open surface 25, air exchange port 54 and housing 12 as well as the seal 30 between the housing 12 and base 34 can include a gasket of low cell density closed cell structure PVC, rubber or other compliant seal material. The bellows 56 is disposed in manner to cause proportional expansion or contraction of the bellows volume related to similar changes in the working volume of the cabinet, and much smaller changes in chamber pressure. These bellows volume changes are directly related to the rise of the weighted bellows bottom, readily visible when viewing and operating the evacuatable housing 12 from a side thereof 12 in which the glove ports 46 are formed to provide a graphic visual indication of negative pressure and of the margin of safety for a safe, vacuum protected environment. The graphic indication of pressure, vacuum and the change of volume displayed by the bellows aids the operator in moderating hand/glove movements to ensure safe, negative pressure operation.

A one way check valve 62 is provided in the line 24 and disposed adjacent the housing 12 to prevent air return back into the enclosure 10. This is a safety device in the event of a pump 22 malfunction.

Additionally, it is contemplated that another treatment device 66 can be employed in the invention, which can include a filter, chemical bath, radiation, or thermal treatment, for example, through which the air through moves to treat the hazardous material and send the air to safe discharge point. As air is drawn into the enclosure 10 by the pump 22, a negative pressure will occur. When the pressure has dropped to a level as indicated by the set parameters of the fluid level and dip tubes, bubbling will occur in the fluid F and thus the bubble gauge 16 provides a quick and sure visible means for confirming that a safe enclosed environment is in place. The raised bellows 56 also provides an additional visual indication.

The above described embodiment is set forth by way of example and is not for the purpose of limiting the present invention. It will be readily apparent to those skilled in the art that obvious modifications, derivations and variations can be made to the embodiment without departing from the scope of the invention. Accordingly, the claims appended hereto should be read in their full scope including any such modifications, derivations and variations.

What is claimed is:

1. An evacuatable enclosure which is used for handling hazardous and suspect articles, which includes:
a sealable housing having a first air inlet, a first air outlet for air evacuation from said housing and an air exchange port;
a bubble gauge operably connected to said first air inlet wherein said bubble gauge includes a column sealed to atmospheric pressure and is partially filled with a fluid having a dip tube sealably extending through one end of said column and into said fluid to provide a visual indicator of pressure in said housing and a path for pressure regulated air to pass through said fluid into said housing;
a pump operably connected to said first air outlet for maintaining subatmospheric pressure in said housing and for drawing a stream of air inwardly through said first air inlet via said bubble gauge into said housing and out said first air outlet in a safe manner;
at least one glove port formed in a side of said housing;
a flexible relatively gas impermeable glove connected to said glove port, wherein said glove extends in said housing to enable objects to be handled therein; and
a sealed bellows operably connected to said air exchange port and which provides for changes in air volume within said housing due to glove movement within said housing when under subatmospheric pressure, wherein said bellows includes a bottom being weighted such that when a predetermined negative pressure is created by said pump in said enclosure said bellows operates to partially collapse to an extent proportional to volume change and smaller pressure change in said housing and is disposed in manner to be readily visible when viewing and operating said evacuatable enclosure from said side of said housing to provide a visual indication of pressure change, remaining bellows volume and safe environment.

2. The evacuatable enclosure of claim 1, which further includes a filter interposed in a stream of air leading to said first air outlet for preventing particulate materials from escaping from said housing through said first air outlet.

3. The evacuatable enclosure of claim 1, wherein said housing is a transparent rigid convex dome having a bottom lip defining an opening wherein said lip is configured with a seal to enable a sealable connection to a flat surface.

4. The evacuatable enclosure of claim 3, which further includes a base which mates to said lip and is hingedly connected thereto such that said housing is sealably connectable to said base.

5. The evacuatable enclosure of claim 1, which includes a pair of said glove ports and pair of said gloves and wherein said gloves connect to a lip of each said glove port.

6. The evacuatable enclosure of claim 1, wherein said fluid includes a dye to aid in visual confirmation indicating air passing therein.

7. The evacuatable enclosure of claim 4, which includes means for securing said base to said housing.

8. The evacuatable enclosure of claim 1, which further includes a check valve operably interposed between said first air outlet and said pump.

9. The evacuatable enclosure of claim 1, which further includes a secondary air treatment device operably interposed in said air stream from said first air outlet to pump.

10. An evacuatable enclosure which is used for handling hazardous suspect articles, which includes:
a sealable housing having a first air inlet, a first air outlet for air evacuation from said housing and an air exchange port;
a pressure regulator operably connected to said first air inlet to permit a path for pressure regulated air to pass through said pressure regulator into said housing;
a pump operably connected to said first air outlet for maintaining subatmospheric pressure in said housing and for drawing a stream of air inwardly through said first air inlet via said pressure regulator into said housing and out said first air outlet in a safe manner;
at least one glove port formed in a side of said housing;
a flexible relatively gas impermeable glove connected to said glove port, wherein said glove extends in said housing to enable objects to be handled therein; and
a sealed bellows operably connected to said air exchange port and which provides for changes in air volume within said housing due to glove movement within said housing when under subatmospheric pressure, wherein said bellows includes a bottom being weighted such that when a predetermined negative pressure is created by said pump in said enclosure said bellows operates to partially collapse to an extent proportional to volume change and smaller pressure change in said housing and is disposed in manner to be readily visible when viewing and operating said evacuatable enclosure from said side of said housing to provide a visual indication of pressure change, remaining bellows volume and safe environment.

11. The evacuatable enclosure of claim 1, which further includes a filter to prevent contamination from entering said bellows.

12. An evacuatable enclosure which is used for handling hazardous and suspect articles, which includes:
a sealable housing having a first air inlet, a first air outlet for air evacuation from said housing and an air exchange port;
a bubble gauge operably connected to said first air inlet;
a pump operably connected to said first air outlet for maintaining subatmospheric pressure in said housing and for drawing a stream of air inwardly through said first air inlet via said bubble gauge into said housing and out said first air outlet in a safe manner;
at least one glove port formed in a side of said housing;
a flexible relatively gas impermeable glove connected to said glove port, wherein said glove extends in said housing to enable objects to be handled therein; and
a sealed bellows operably connected to said air exchange port and which provides for changes in air volume within said housing due to glove movement within said housing when under subatmospheric pressure and wherein said bellows includes a bottom being weighted such that when a predetermined negative pressure is created by said pump in said enclosure said bellows operates to proportionally collapse and is disposed in manner to be readily visible when viewing and operating said evacuatable enclosure from said side of said housing to provide visual indication of pressure and volume change in said housing, and an indication of remaining bellows capacity to allow additional glove movement while maintaining a safe pressure protected environment.

13. The evacuatable enclosure of claim 12, which further includes a filter interposed in a stream of air leading to said first air outlet for preventing particulate materials from escaping from said housing through said first air outlet.

14. The evacuatable enclosure of claim 12, wherein said housing is a transparent rigid convex dome having a bottom lip defining an opening wherein said lip is configured with a seal to enable a sealable connection to a flat surface.

15. The evacuatable enclosure of claim 14, which further includes a base which mates to said lip and is hingedly connected thereto such that said housing is sealably connectable to said base.

16. The evacuatable enclosure of claim 15, which includes means for securing said base to said housing.

17. The evacuatable enclosure of claim 12, which includes a pair of said glove ports and pair of said gloves and wherein said gloves connect to an inwardly extending lip.

18. The evacuatable enclosure of claim 12, wherein said bubble gauge includes a fluid which includes a dye to aid in visual confirmation indicating air passing therein.

19. The evacuatable enclosure of claim 12, which further includes a check valve operably interposed between said second air inlet and said pump.

20. The evacuatable enclosure of claim 12, which further includes a secondary air treatment device operably interposed in said air stream.

* * * * *